March 26, 1968

N. A. LYSHKOW 3,375,079

COLORIMETRIC REAGENT FOR ANALYSIS OF NITROGEN DIOXIDE IN
AIR AND METHOD OF USE

Filed June 8, 1965

Inventor
Norman A. Lyshkow
By
Wolfe, Hubbard,
Voit & Osann.
Attys.

Inventor
Norman A. Lyshkow
By
Wolfe, Hubbard,
Voit, & Osann.
Attys.

United States Patent Office 3,375,079
Patented Mar. 26, 1968

3,375,079
COLORIMETRIC REAGENT FOR ANALYSIS OF NITROGEN DIOXIDE IN AIR AND METHOD OF USE
Norman A. Lyshkow, Chicago, Ill., assignor to Precision Scientific Company, Chicago, Ill., a corporation of Illinois
Filed June 8, 1965, Ser. No. 462,226
12 Claims. (Cl. 23—232)

ABSTRACT OF THE DISCLOSURE

A Greiss-type colorimetric reagent for the analysis of nitrogen dioxide in air, the reagent containing one to four grams sulfanilamide or sulfanilic acid per liter of reagent, 0.025 to 0.75 gram N(1-naphthyl) ethylenediamine dihydrochloride per liter of reagent, 0.025 to 0.075 gram 2-naphthol 3,6 disulfonic acid disodium salt per liter of reagent, and the balance tartaric acid or acetic acid in an amount such that the reagent has a pH of less than four. The disodium salt is described as improving both the rate and intensity of color development, as well as the absorption efficiency of the reagent even at extremely low nitrogen dioxide levels.

---

The present invention relates generally to colorimetric reagents and, more particularly, to an improved colorimetric reagent for the analysis of nitrogen dioxide in air.

The use of colorimetric reagents for the analysis of nitrogen dioxide in air has been proposed heretofore. Thus, the well-known Griess reagent has been used to detect nitrogen dioxide in air by the formation of an azo dye. Such methods involve the initial diazotization of an amine

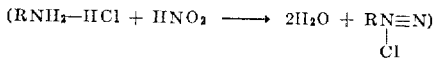

with the resulting diazo compound being coupled with a reactive aromatic amine or phenol to form an azo dye, as follows:

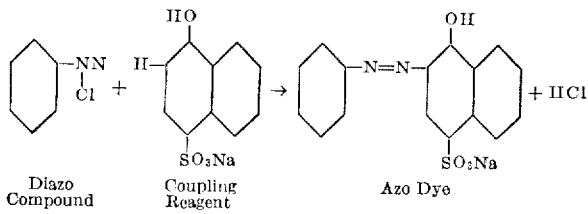

| Diazo Compound | Coupling Reagent | Azo Dye |

This type of reaction was originally described by Griess in 1879 and, as mentioned above, has been used more recently for detecting traces of nitrogen dioxide as a pollutant in the atmosphere. However, although the Griess-type reagents available heretofore have been suitable for certain applications, their relatively slow rate of color development and other shortcomings have made them unsatisfactory for use in the rapid-sensing continuous monitoring instruments being developed today.

It is a primary object of this invention to provide an improved colorimetric reagent which is capable of detecting traces of nitrogen dioxide in air with a rapid rate of color development. A related object is to provide such a reagent which is capable of detecting rapid fluctuations in the nitrogen dioxide level, including detection of the full peak value of nitrogen dioxide pulses or "whiffs" of short duration.

It is another object of the present invention to provide an improved colorimetric reagent of the foregoing type which provides a relatively high color intensity at any given nitrogen dioxide level, thereby improving the sensitivity of the detection system in which the reagent is used. In this connection, it is a related object of the invention to provide such a reagent which develops maximum color intensity in a relatively short response period. More particularly, it is an object to provide such a reagent which is capable of developing 96% of final color intensity in one minute.

A further object of the invention is to provide an improved colorimetric reagent of the type described above which is stable over extended storage periods.

Still another object of this invention is to provide such an improved colorimetric reagent which has good color stability, i.e., in which the developed color retains its intensity and does not fade for a period sufficiently long to permit accurate recording of the color intensity.

A still further object is to provide an improved colorimetric reagent of the foregoing type which provides improved absorption efficiency. Thus, it is an object to provide such a reagent which is capable of absorbing ninety per cent or more of the nitrogen dioxide even at concentrations as high as two parts per million.

It is an object of one aspect of this invention to provide an improved Griess-type colorimetric reagent which develops a relatively high color intensity at a first rate, which has good shelf-life and color stability, and which provides improved absorption efficiency.

Other objects and advantages of this invention will become apparent upon reading the following detailed description and upon reference to the drawings, in which.

Figure 3:
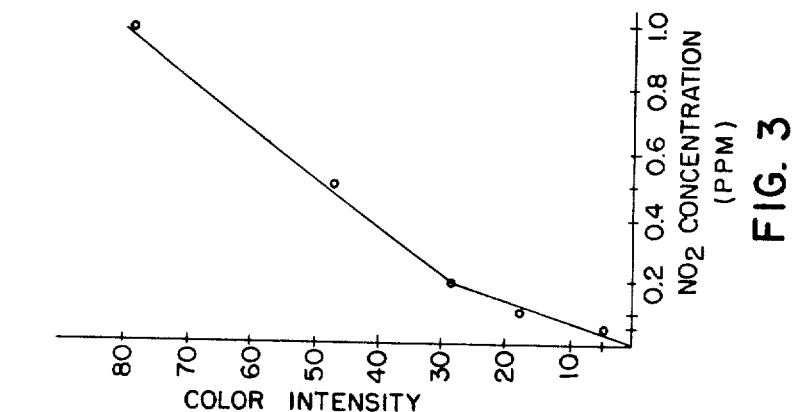
FIG. 3 is a graph of color intensity plotted against nitrogen dioxide concentration for a preferred reagent embodying the present invention.

While the invention will be described in connection with certain preferred embodiments, it is to be understood that this invention is not intended to be limited to the particular embodiments disclosed but, on the contrary, it is intended to cover the various modifications and equivalent arrangements included within the spirit and scope of the appended claims.

In accordance with the present invention, there is provided an improved colorimetric reagent for detecting nitrogen dioxide in air, which reagent comprises a diazotizing agent selected from the group consisting of sulfanilic acid and sulfanilamide; N(1-naphthyl) ethylenediamine dihydrochloride; an organic acid selected from the group consisting of acetic acid and tartaric acid; and 2-naphthol 3,6 disulfonic acid disodium salt.

Both sulfanilamide and sulfanilic acid have been found to be suitable for use as diazotizing agents in the reagent of this invention. Sulfanilamide is preferred because it provides a somewhat faster rate of color development, and also produces a greater color intensity. The concentration of the diazotizing agent in the reagent is not critical, and is suitably within the range of about one to four grams of diazotizing agent per liter of reagent, with the optimum concentration being about 1.5 grams per liter of reagent. Concentrations above about four grams per liter lead to excessive decomposition of the reagent, while concentrations below about one gram per liter impair the capture of nitrogen dioxide from the air.

The N(1-naphthyl) ethylenediamine dihydrochloride serves as the coupling reagent in the inventive composition, and has been found to impart better stability to the nitrogen dioxide-detecting reagent than other available coupling agents. The concentration of coupling reagent affects both the rate and intensity of color development and is preferably within the range of about 0.01 to about 0.50 gram per liter of reagent. The optimum concentration for the N(1-naphthyl) ethylenediamine dihydrochloride is about 0.05 gram per liter. In general, the rate of color development increases with increasing concentrations of the coupling reagent until a maximum point is reached, after which further increases in the coupling reagent concentration reduce the rate of color development. Both the final color intensity and the shelf-life of the inventive reagent tend to decrease with increasing concentrations of coupling reagent.

Both acetic and tartaric acid are suitable organic acids for use in the inventive reagents, but tartaric acid is preferred because it provides a higher rate and intensity of color development than acetic acid. The exact concentration of organic acid in the reagent is not critical so long as the reagent has a pH less than four.

It has been surprisingly found that the 2-naphthol 3,6 disulfonic acid disodium salt improves both the rate and intensity of color development, and increases the absorption efficiency of the reagent even at extremely low nitrogen dioxide levels. The disulfonate should be present in an amount within the range of about 0.025 to about 0.075 gram per liter of reagent, with the optimum concentration being about 0.05 gram per liter for maximum rate and intensity of color development. The effectiveness of the disulfonate falls off both above and below the prescribed range.

The optimum formulation for the inventive reagent is as follows:

0.050 gram N(1-naphthyl) ethylenediamine dihydrochloride
0.050 gram 2-naphthol 3,6 disulfonic acid disodium salt
1.500 grams sulfanilamide
15.0 grams tartaric acid
Deionized water to make one liter of solution A reagent having the above formulation has been found to be capable of developing 96% of its final color intensity in one minute, with the final color being more than 15% more intense than the same reagent without the disulfonate. Moreover, the absorption efficiency of the reagent has been demonstrated to be in excess of 90% at a nitrogen dioxide level of one part per million in air, as compared with an absorption efficiency of about 70% for the best Griess-type reagents used heretofore at the same nitrogen dioxide level. In addition, the inventive reagent has a shelf-life exceeding ten days, and a color stability of at least 30 minutes which is more than adequate to permit accurate recording of the color intensity. This combination of properties is of considerable practical and commercial importance, and is especially useful in the high speed continuous atmospheric monitoring instruments, which have been developed only recently. Indeed, actual field tests have shown that when this reagent is used in the latest atmospheric monitoring instrument, it is capable of resolving short duration nitrogen dioxide pulses or "wiffs" as low as 0.05 to 0.10 parts per million.

In order to demonstrate the vastly superior performance of the reagent provided by this invention, a series of four reagent samples was prepared with each sample having a different concentration of N(1-naphthyl) ethylenediamine dihydrochloride. All the samples contained 0.05 gram/liter N(1-naphthyl) ethylenediamine dihydrochloride and 15 grams tartaric acid. These samples were separated into two groups, and 2-naphthol 3,6 disulfonic acid disodium salt was added to each sample in the second group at a concentration of 0.05 gram/liter. No disulfonate was added to the first group of samples.

Figure 2:
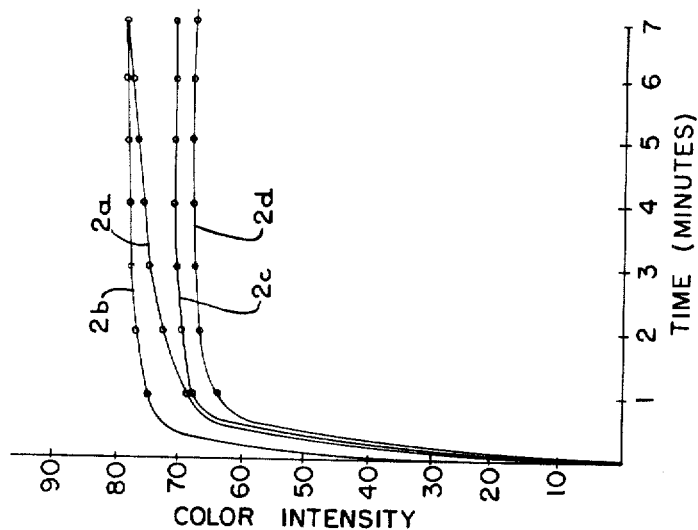
FIG. 2 is a graph of color intensity plotted against time for the Griess-type reagents of FIGURE 1 as modified in accordance with this invention.
Figure 1:
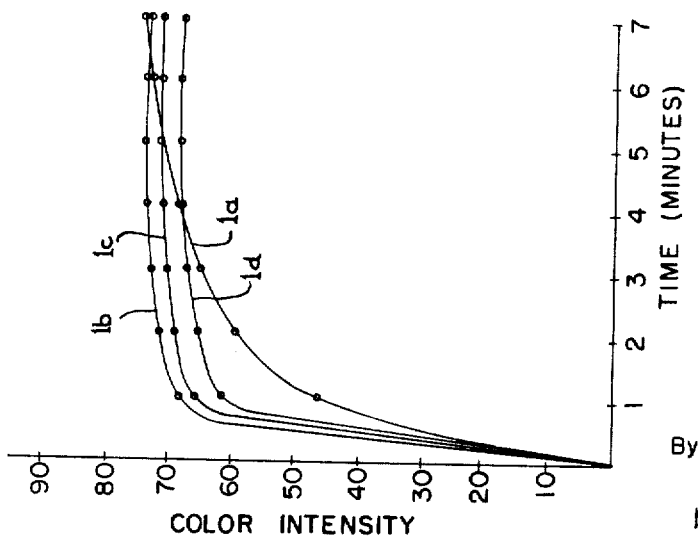
FIG. 1 is a graph showing color intensity plotted against time for a first series of Griess-type colorimetric reagents.

Each of the eight samples was then used in a high speed colorimetric analyzer for detecting a known level of nitrogen dioxide in air, and the color intensity of each sample was recorded and plotted as a function of time. The results of these tests are shown in FIGURES 1 and 2. The concentrations of diamine dihydrochloride in the two groups of samples represented by the various curves in FIGURES 1 and 2 were as follows:

FIGURE 1

N(1-naphthyl)ethylenediamine·2HCl

| Curve: | G./l. |
|---|---|
| 1a | 0.01 |
| 1b | 0.05 |
| 1c | 0.10 |
| 1d | 0.50 |

FIGURE 2

| 2a | 0.01 |
|---|---|
| 2b | 0.05 |
| 2c | 0.10 |
| 2d | 0.50 |

The results of the tests illustrated in FIGURES 1 and 2 are summarized in the following table:

| N(1-naphthyl) ethylene-diamine.2HCl (g./l.) | No Disulfonate | | 50 mg. Disulfonate | |
|---|---|---|---|---|
| | Final Intensity | Time to 96% F.I. (min.) | Final Intensity | Time to 96% F.I. (min.) |
| 0.01 | 74.5 | 4.5 | 79 | 2.8 |
| .05 | 72 | 2.2 | 79 | 1.1 |
| .10 | 69.5 | 1 | 71.5 | 1 |
| .50 | | | 66 | 1.3 |

As can be seen from the above table and a comparison of FIGURES 1 and 2, the addition of the disulfonate effects a considerable increase in the final color intensity of the reagent, while substantially reducing the response time required to attain that intensity. Consequently, the sulfonate-containing reagent is both faster and more sensitive.

Figure 6:
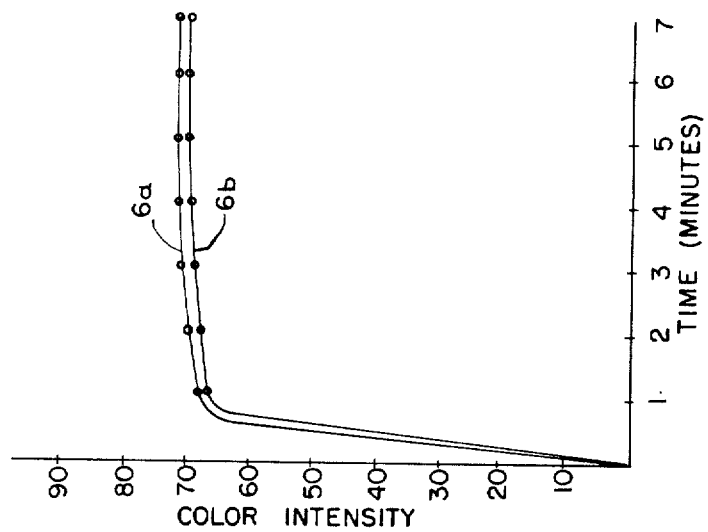
FIG. 6 is a graph of color intensity plotted against time for two colorimetric reagents one of which embodies the present invention.
Figure 5:
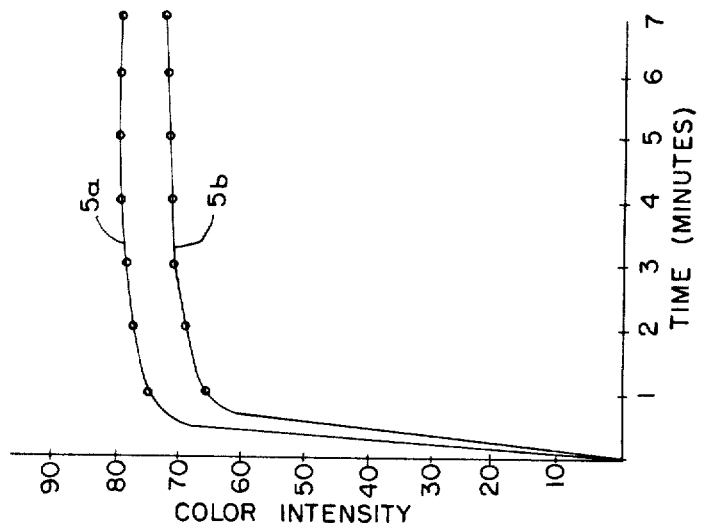
FIG. 5 is a graph of color intensity plotted against time for two colorimetric reagents one of which embodies the present invention.
Figure 4:
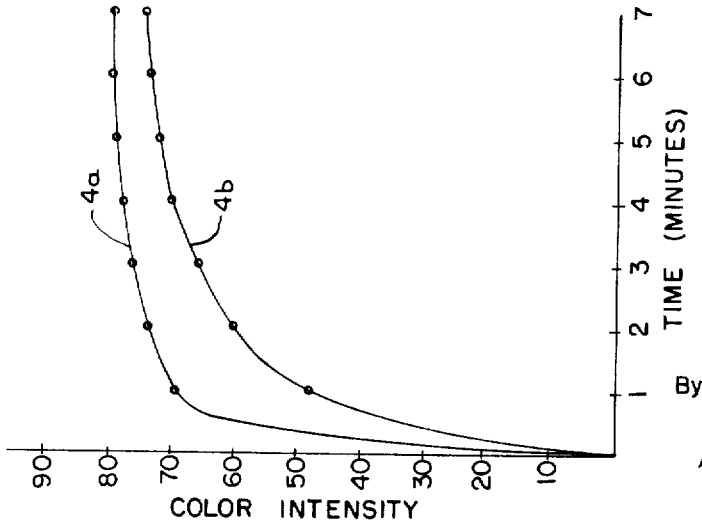
FIG. 4 is a graph of color intensity plotted against time for two colorimetric reagents one of which embodies the present invention.

In FIGS. 4–6, three pairs of curves from FIGS. 1 and 2 have been reproduced side by side for the purpose of showing how the effectiveness of the sulfonate varies with increasing concentrations of the coupling agent, N(1-naphthyl) ethylenediamine dihydrochloride. In FIG. 4, the two curves represent the two samples containing 0.010 g./l. coupling agent, with curve 4a representing the sulfonate-containing reagent and curve 4b representing the sulfonate-free reagent. In FIG. 5, the samples contain 0.050 g./l. coupling agent, with curve 5a representing the sulfonate-containing reagent and curve 5b the sulfonate-free reagent. In FIG. 6, 0.100 g./l. agent is used with curve 6a representing the sulfonate-containing sample and 6b the sulfonate-free sample. As can be seen from a comparison of the three pairs of curves, the degree of improvement effected by the sulfonate is markedly greater at the lower levels of coupling agent. In fact, the addition of the sulfonate to the 0.01 g./l. sample actually resulted in a performance curve which approached those of the 0.05 and 0.10 g./l. samples.

FIGURE 3 shows the results of a test run with a reagent having the optimum formulation described above, and with a gradually increasing concentration of NO₂ in the air being analyzed. The NO₂ concentration was varied from zero to two parts per million in air, with one milliliter of reagent being used per liter of air. The color intensity of the reagent was recorded at periodic intervals and plotted as a function of NO₂ concentration in parts per million. As can be seen from the resulting graph shown in FIG. 3, the reagent was capable of detecting traces of nitrogen dioxide at levels as low as 0.05 p.p.m.

In another series of tests, a recently developed high speed colorimetric atmospheric monitoring instrument was used to measure the nitrogen dioxide content of the atmosphere over an extended period. When a conventional Griess reagent was used in the instrument, it was found that the instrument was so much faster than the reagent that full color development did not occur until the reagent had passed the color-sensing network in the instrument. Moreover, "color pockets" were formed within the optical cells through which the reagent was passed in the sensing network.

When a reagent having the optimum formulation provided by this invention was substituted for the conventional Griess reagent, the pollutant levels of nitrogen dioxide were found to be approximately 30% higher with much greater variation in the pollutant levels than observed before. Sampling of the atmosphere was conducted during periods of low pollutant levels at full scale sensitivities of twenty parts per hundred million with excellent results. Moreover, the increased absorption efficiency of the new reagent enabled the instrument and reagents to be calibrated with nitrite solutions, and such calibrations agreed closely with dynamic methods. Consequently, a considerably closer check on reagent stability and instrument calibration was permitted by this rapid static method.

Certain additives may be used in the reagent composition provided by this invention, if desired. For example, it is often desirable to add wetting agents to reagents of this type. Other suitable additives for various purposes will be readily apparent to those skilled in the art.

It can be seen from the foregoing detailed description and examples that this invention provides an improved colorimetric reagent which is capable of detecting traces of nitrogen dioxide in air with a fast rate of color development and with a relatively high color intensity for any given nitrogen dioxide level. Consequently, this reagent is especially useful in high speed continuous atmospheric monitors, and is even capable of detecting the full peak value of short duration $NO_2$ "whiffs" which are often responsible for intense though infrequent odor problems. Even with the higher color intensity achieved by this reagent, it is capable of developing 96% of its final color intensity in one minute. Moreover, the inventive reagent has a relatively long shelf-life and good color stability. In addition, a substantially improved absorption efficiency is provided by the inventive reagent and, indeed, it has been demonstrated to be capable of absorbing 90% or more of the nitrogen dioxide in the air sample even at concentrations as low as one part per million. This combination of desirable properties is of considerable importance from a practical and commercial standpoint, and represents a significant advance in the art of Griess-type reagents.

I claim as my invention:

1. A colorimetric reagent for detecting nitrogen dioxide in air, said reagent consisting essentially of sulfanilamide, N(1-naphthyl) ethylenediamine dihydrochloride, tartaric acid, and 2-naphthol 3,6 disulfonic acid disodium salt.

2. A colorimetric reagent for detecting nitrogen dioxide in air, said reagent consisting essentially of sulfanilamide, N(1-naphthyl) ethylenediamine dihydrochloride, tartaric acid, and about 0.025 to about 0.075 gram 2-naphthol 3,6 disulfonic acid disodium salt per liter of reagent.

3. A colorimetric reagent for detecting nitrogen dioxide in air, said reagent consisting essentially of a diazotizing agent selected from the group consisting of sulfanilic acid and sulfanilamide, N(1-naphthyl) ethylenediamine dihydrochloride, an organic acid selected from the group consisting of acetic acid and tartaric acid, and 2-naphthol 3,6 disulfonic acid disodium salt.

4. A colorimetric reagent for detecting nitrogen dioxide in air, said reagent consisting essentially of about one to about four grams sulfanilamide per liter of reagent, about 0.025 to about 0.75 gram N(1-naphthyl) ethylenediamine dihydrochloride per liter of reagent, about 0.025 to about 0.075 gram 2-naphthol 3,6 disulfonic acid disodium salt per liter of reagent, and the balance tartaric acid, said tartaric acid being present in an amount such that the reagent has a pH less than four.

5. A colorimetric reagent for detecting nitrogen dioxide in air, said reagent consisting essentially of 1.50 gram sulfanilamide per liter of reagent, 0.05 gram N(1-naphthyl) ethylenediamine dihydrochloride per liter of reagent, 0.05 gram 2-naphthol 3,6 disulfonic acid disodium salt per liter of reagent, and 15.0 gram tartaric acid per liter of reagent.

6. A Griess-type reagent for the analysis of nitrogen dioxide in air, said reagent comprising a diazotizing agent for reacting with the nitrogen dioxide in the air to form a diazo compound, a coupling reagent other than 2-naphthol 3,6 disulfonic acid disodium salt for reacting with the diazo compound to form an azo dye, an organic acid, and 2-naphthol 3,6 disulfonic acid disodium salt.

7. A Griess-type reagent for the analysis of nitrogen dioxide in air, said reagent comprising a diazotizing agent for reacting with the nitrogen dioxide in the air to form a diazo compound, a coupling reagent other than 2-naphthol 3,6 disulfonic acid disodium salt for reacting with the diazo compound to form an azo dye, an organic acid, and 2-naphthol 3,6 disulfonic acid disodium salt, said salt being present in an amount within the range of about 0.025 to 0.075 gram per liter of reagent.

8. A method of detecting nitrogen dioxide in air which comprises the steps of contacting the air with a reagent consisting essentially of sulfanilamide, N(1-naphthyl) ethylenediamine dihydrochloride, tartaric acid, and 2-naphthol 3,6 disulfonic acid disodium salt, and detecting changes in the color of the reagent after contacting the air with the reagent.

9. A method of detecting nitrogen dioxide in air which comprises the steps of contacting the air with a reagent consisting essentially of sulfanilamide, N(1-naphthyl) ethylenediamine dihydrochloride, tartaric acid, and about 0.025 to about 0.075 gram 2-naphthol 3,6 disulfonic acid disodium salt per liter of reagent, and detecting changes in the color of the reagent after contacting the air with the reagent.

10. A method of detecting nitrogen dioxide in air which comprises the steps of contacting the air with a reagent consisting essentially of a diazotizing agent selected from the group consisting of sulfanilic acid and sulfanilamide, N(1-naphthyl) ethylenediamine dihydrochloride, an organic acid selected from the group consisting of acetic acid and tartaric acid, and 2-naphthol 3,6 disulfonic acid disodium salt, and detecting changes in the color of the reagent after contacting the air with the reagent.

11. A method of detecting nitrogen dioxide in air which comprises the steps of contacting air with a reagent consisting essentially of about one to about four grams sulfanilamide per liter of reagent, about 0.025 to about 0.75 gram N(1-naphthyl) ethylenediamine dihydrochloride per liter of reagent, about 0.025 to about 0.075 gram 2-naphthol 3,6 disulfonic acid, said tartaric acid being present in an amount such that the reagent has a pH less than four disodium salt per liter of reagent, and the balance tartaric acid, and detecting changes in the color of the reagent after contacting the air with the reagent.

12. A method of detecting nitrogen dioxide in air which comprises the steps of contacting air with a reagent consisting essentially of 1.50 gram sulfanilamide per liter of reagent, 0.05 gram N(1-naphthyl) ethylenediamine dihydrochloride per liter of reagent, 0.05 gram 2-naphthol 3,6 disulfonic acid disodium salt per liter of reagent, and 15.0 gram tartaric acid per liter of reagent, and detecting changes in the color of the reagent after contacting the air with the reagent.

References Cited

Saltzman, "Colorimetric Microdetermination of Nitrogen Dioxide in Atmosphere," Anal. Chem., vol. 26, p. 1949, 1954.

Fieser et al., "Advanced Organic Chemistry," pp. 898–899, Reinhold, N.Y., 1961.

Suckfuell et al., "Synthesis of Unsymmetrical Azo Compounds," Chem. Abs., vol. 36, pp. 3040–3041, August 1964.

MORRIS O. WOLK, *Primary Examiner.*

L. MEI, D. G. CONLIN, *Assistant Examiners.*